(12) United States Patent
Gomi (10) Patent No.: US 11,976,974 B2
(45) Date of Patent: May 7, 2024

(54) SPECTROMETER AND COMPUTER PROGRAM

(71) Applicant: SEIKO EPSON CORPORATION, Tokyo (JP)

(72) Inventor: Tsugio Gomi, Fujimi-machi (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/663,906

(22) Filed: May 18, 2022

(65) Prior Publication Data
US 2022/0373391 A1    Nov. 24, 2022

(30) Foreign Application Priority Data

May 18, 2021   (JP) .................. 2021-083698

(51) Int. Cl.
*G01J 3/28*      (2006.01)
*G01J 3/12*      (2006.01)

(52) U.S. Cl.
CPC .......... *G01J 3/2803* (2013.01); *G01J 3/2823* (2013.01); *G01J 2003/1213* (2013.01)

(58) Field of Classification Search
CPC ............. G01J 2003/1213; G01J 3/2803; G01J 3/2823; G01J 3/28; G01J 3/26
See application file for complete search history.

(56) References Cited

U.S. PATENT DOCUMENTS

| | | | | |
|---|---|---|---|---|
| 7,408,645 | B2* | 8/2008 | DiFoggio | G02B 26/02 356/70 |
| 9,163,986 | B2* | 10/2015 | Bouckaert | G01J 3/28 |
| 9,970,817 | B2* | 5/2018 | Sakurai | G01J 3/26 |
| 10,605,660 | B2 | 3/2020 | Raz et al. | |
| 2011/0292386 | A1* | 12/2011 | Funamoto | G01J 3/02 356/319 |
| 2014/0052402 | A1 | 2/2014 | Arai | |
| 2014/0240711 | A1* | 8/2014 | Matsushita | G01J 3/51 356/451 |
| 2016/0091369 | A1* | 3/2016 | Sakurai | G01J 3/26 356/402 |
| 2019/0323887 | A1* | 10/2019 | Ishihara | G01J 3/28 |
| 2021/0025755 | A1* | 1/2021 | Knobbe | G01J 3/0286 |

FOREIGN PATENT DOCUMENTS

JP       2014038081 A      2/2014

* cited by examiner

*Primary Examiner* — Abdullahi Nur
(74) *Attorney, Agent, or Firm* — CHIP LAW GROUP (57) ABSTRACT

A spectroscopic camera includes a spectroscopic element and a light receiver, and a method for correcting the spectroscopic camera includes causing light having a first wave number from a spectroscopic light source to be incident on the spectroscopic element, causing the light receiver to receive light having a second wave number and outputted from the spectroscopic element, generating a matrix representing the spectral characteristics of the light having the second wave number based on the output from the light receiver, and generating a correction matrix based on the inverse matrix of the matrix and storing the correction matrix in a storage section.

7 Claims, 11 Drawing Sheets

WHEN M IS SQUARE MATRIX, $\quad M^{\dagger} = M^T \cdot (M \cdot M^T)^{-1} \quad \cdots \quad (17)$ $\quad M^{\dagger} = M^T \cdot M^{T-1} \cdot M^{-1} \quad \cdots \quad (18)$ $\quad M^{\dagger} = M^{-1} \quad \cdots \quad (19)$ PSEUDO-INVERSE MATRIX $\quad M^{\dagger} = M^T \cdot (M \cdot M^T)^{-1} \quad \cdots \quad (20)$

FIG. 13

HOW TO DETERMINE CORRECTION VALUE $M^\dagger$

$$M^\dagger = (M + \beta I)^{-1} \quad \cdots (21)$$

$$M^\dagger = M^T (M M^T + \beta I)^{-1} \quad \cdots (22)$$

$$M^\dagger = (M + \beta (M^T)^{-1})^{-1} \quad \cdots (23)$$

$\beta$ : REGULARIZATION PARAMETER
$I$ : UNIT MATRIX

MEASUREMENT WITH GENERAL-PURPOSE SPECTROSCOPE

SPECTROMETER AND COMPUTER PROGRAM The present application is based on, and claims priority from JP Application Serial Number 2021-083698, filed May 18, 2021, the disclosure of which is hereby incorporated by reference herein in its entirety.

BACKGROUND

1. Technical Field

The present disclosure relates to a spectrometer and a computer program.

2. Related Art

For example, JP-A-2014-38081 discloses a method for measuring colors (color chart) printed on a medium with a reference spectral colorimeter and a spectrometer, determining a standard correction value (estimated matrix) in advance, applying the correction value to a spectrometer, and producing a reflection spectrum close to that produced by the reference spectral colorimeter.

For example, U.S. Pat. No. 10,605,660 discloses a method for producing a reflection spectrum by adding a coefficient to a transmission profile.

The method described in JP-A-2014-38081, however, has a problem of incorrect correction in a case where a medium under measurement differs from a medium used to determine the correction value. In addition, the method has another problem of necessity for determination of another correction value in a case where the spectrometer is formed of a different illumination light source, a different spectroscopic element, or any other different element. Furthermore, when an unknown illumination light source is used, as in the case of a spectroscopic camera, a correct reflection spectrum cannot be produced, and other problems are encountered.

The method described in U.S. Pat. No. 10,605,660 does not describe the sensitivity spectrum of the light receiver or the illumination spectrum, and has a problem of unclear characteristics contained in the transmission profile.

That is, there is a need for a versatile correction method that allows measurement of a correct optical spectrum with no need for preparation of a correction value in advance and with no need for any component other than a spectrometer.

SUMMARY

A spectrometer includes a variable wavelength spectroscopic filter and a photosensor, and a method for correcting the spectrometer includes causing light having a first wave number from a spectroscopic light source to be incident on the variable wavelength spectroscopic filter, causing the photosensor to receive light having a second wave number and outputted from the variable wavelength spectroscopic filter, generating a matrix representing spectral characteristics of the light having the second wave number based on an output from the photosensor, and generating a correction matrix based on an inverse matrix of the matrix and storing the correction matrix in a storage section.

A non-transitory computer-readable storage medium stores a computer program for correcting a spectrometer including a variable wavelength spectroscopic filter and a photosensor, the computer program including causing light having a first wave number from a spectroscopic light source to be incident on the variable wavelength spectroscopic filter, causing the photosensor to receive light having a second wave number and outputted from the variable wavelength spectroscopic filter, generating a matrix representing spectral characteristics of the light having the second wave number based on an output from the photosensor, and generating a correction matrix based on an inverse matrix of the matrix and storing the correction matrix in a storage section.

DESCRIPTION OF EXEMPLARY EMBODIMENTS

How to determine a correction value for a spectrometer will first be described.

The spectral output from a spectrometer is the product of the true spectral characteristics of a measurement target object and the characteristics of a spectroscopic element as a variable wavelength spectroscopic filter. Specifically, let P be the spectral output from the spectrometer (matrix: (m×1)), M be the characteristics of the spectroscopic element, and R be the true spectral characteristics of the measurement target object (matrix: (m×1)), and the spectral output P can be determined by Expression (1) below. That is, the spectral output P can be produced by generating a matrix (m×m) representing the characteristics M of the spectroscopic element.

$$P = M \cdot R \quad (1)$$

The true spectral characteristics R of the measurement target object can therefore be determined by multiplying the spectral output P from the spectrometer by a correction matrix in the form of an inverse matrix generated by using the characteristics of the spectroscopic element. The inverse matrix of the characteristics of the spectroscopic element is the correction value.

Specifically, let $M^{-1}$ be the inverse matrix of the characteristics of the spectroscopic element, and the true spectral characteristics R of the measurement target object can be determined by Expression (2) below.

$$R = M^{-1} \cdot P \quad (2)$$

How to determine Expression (2) from Expression (1) can be determined by Expressions (3) to (6) below. The inverse matrix $M^{-1}$ is the correction value.

$$P = M \cdot R \quad (3)$$

$$M^{-1} \cdot P = M^{-1} \cdot M \cdot R \quad (4)$$

$$M^{-1} \cdot P = E \cdot R \quad (5)$$

$$M^{-1} \cdot P = R \quad (6)$$

M in Expression (3) is a square matrix, that is, a matrix having the same number of rows and columns. Furthermore, M is a regular matrix, that is, an inverse matrix can be derived from M. E in Expression (5) is the unit matrix, that is, "1".

The spectral characteristics of the spectroscopic element, and difference between measured values from a spectrometer equipped with the spectroscopic element and the true spectral characteristics will next be described with reference to FIGS. 1 and 2.

The measurement target object is BCRA 12-color tiles used as a colorimetry reference. The spectroscopic element is a wavelength-variable Fabry-Perot etalon and has a full width at half maximum (resolution) of about 45 nm at the maximum.

Figure 1:
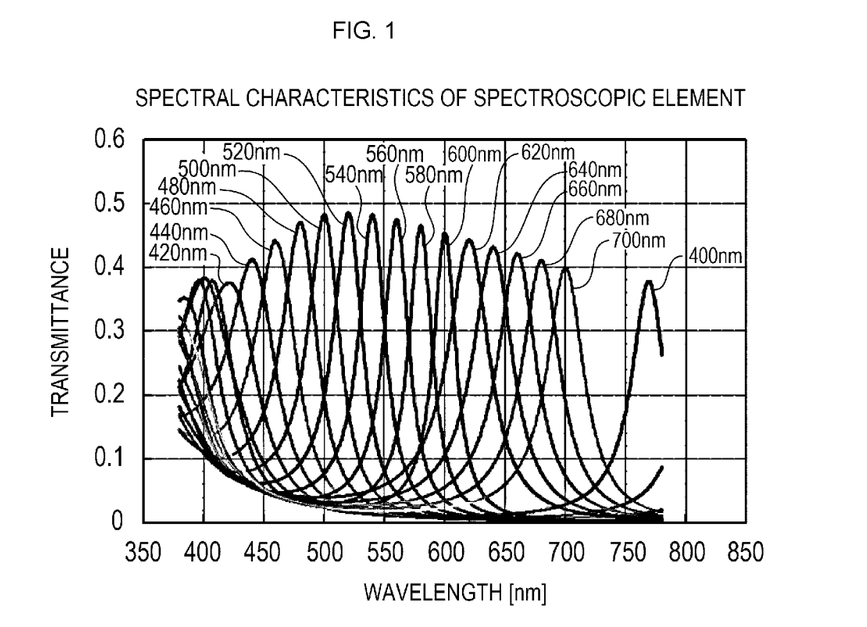
FIG. 1 shows graphs illustrating the spectral characteristics of a spectroscopic element.

The graphs shown in FIG. 1 illustrate an example of the spectral characteristics of the spectroscopic element. In FIG. 1, the horizontal axis represents the wavelength (nm), and the vertical axis represents the transmittance.

Figure 2:
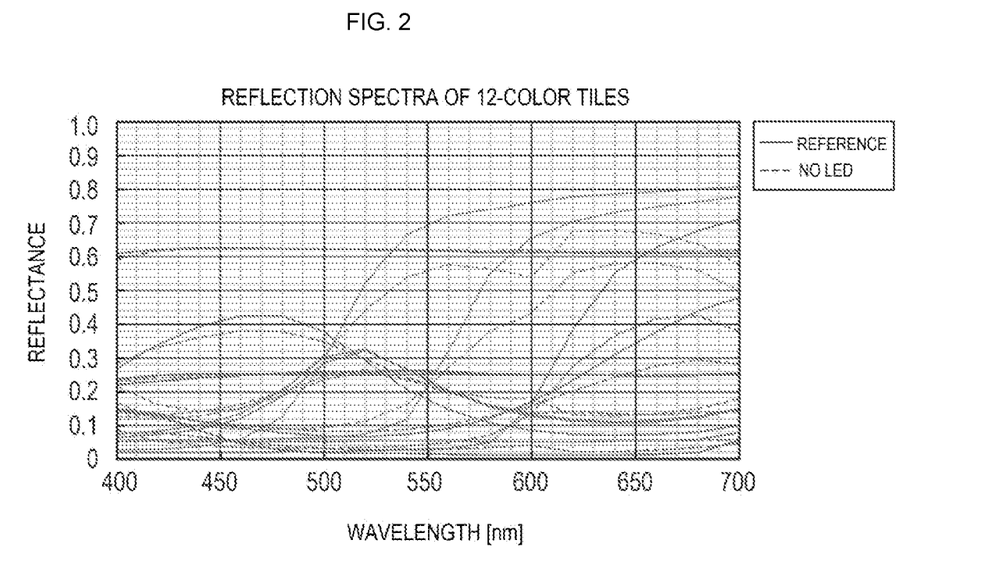
FIG. 2 shows graphs illustrating differences between measured values from a spectroscopic camera and true spectral characteristics.

The graphs shown in FIG. 2 show comparison between the reflection spectra obtained from a reference spectrometer and drawn with solid lines and the reflection spectra measured with the spectroscopic element and drawn with broken lines. The reference reflection spectra described above were measured with a commercially available high-precision spectrophotometer (Shimadzu Corporation, UV-3150), and are considered as true reflection spectra. In FIG. 2, the horizontal axis represents the wavelength (nm), and the vertical axis represents the reflectance. The reflection spectra measured with the spectroscopic element and drawn with the broken lines are produced by using an LED light source.

FIG. 2 shows that there is large discrepancies between the reflection spectra measured with the spectroscopic element and drawn with the broken lines and the true reflection spectra drawn with the solid lines.

The configuration of a spectroscopic camera 100 as the spectrometer according to the present embodiment will next be described with reference to FIG. 3.

Figure 3:
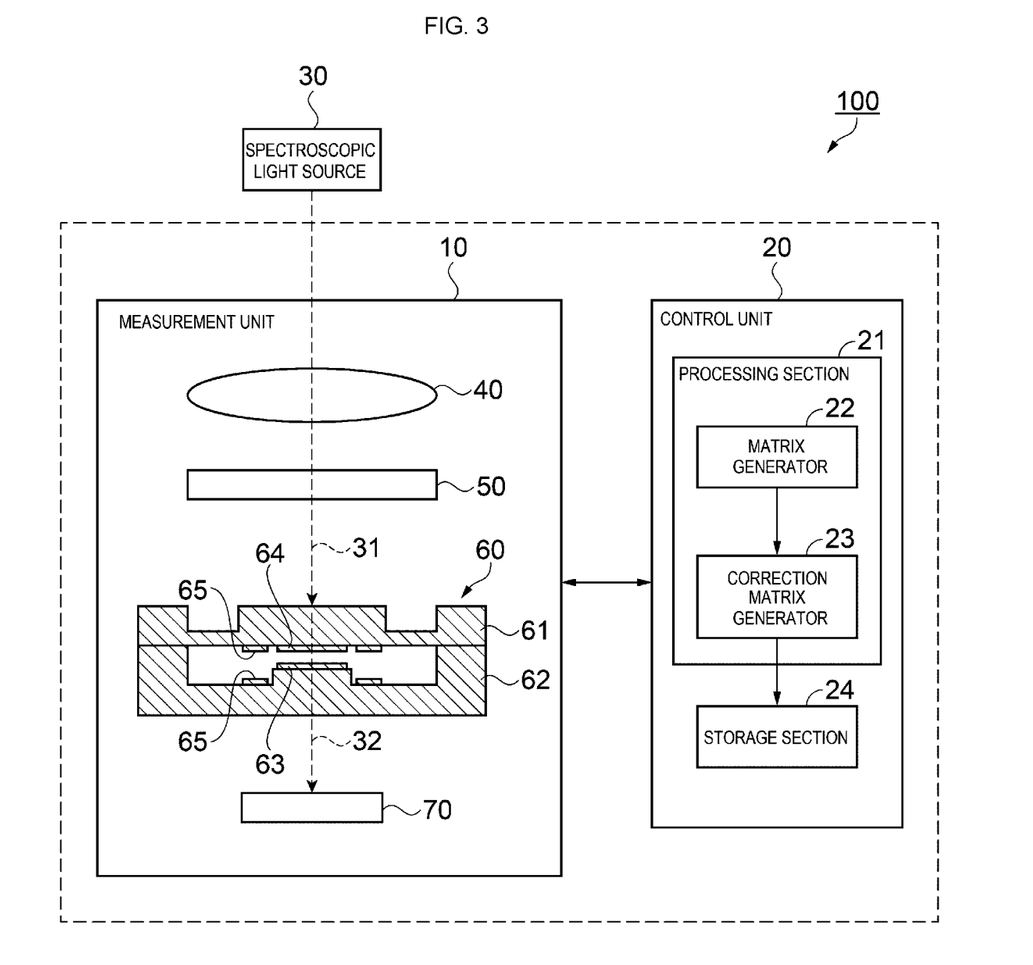
FIG. 3 is a schematic view showing the configuration of a spectroscopic camera according to a first embodiment.

The spectroscopic camera 100 includes a measurement unit 10 and a control unit 20, as shown in FIG. 3.

The measurement unit 10 includes a light-incident-side optical system 40, which light from a spectroscopic light source 30 enters, a bandpass filter (BPF) 50, a spectroscopic element 60, which spectroscopically separates light incident thereon, and a light receiver 70 as a photosensor that captures the light spectroscopically separated by the spectroscopic element 60.

The light-incident-side optical system 40 includes, for example, an autofocus mechanism. The light-incident-side optical system 40 is formed, for example, of a telecentric optical system, and guides light 31 having a first wave number to the spectroscopic element 60 in such a way that the optical axis of the light-incident-side optical system 40 is parallel or substantially parallel to the chief ray of the incident light.

The spectroscopic element 60 is, for example, a wavelength selective filter and is specifically a Fabry-Perot-type filter capable of changing the transmission wavelength band. The spectroscopic element 60 is a wavelength-variable interference filter including a pair of substrates 61 and 62, a pair of reflection films 63 and 64 facing each other, and a gap changer 65 capable of changing the dimension of the gap between the reflection films 63 and 64. The gap changer 65 is formed, for example, of an electrostatic actuator. The wavelength-variable interference filter is also called an etalon. The spectroscopic element 60 is disposed in the optical path of the light to be incident on the light receiver 70.

The spectroscopic element 60 changes the dimension of the gap between the reflection films 63 and 64 by changing the voltage applied to the gap changer 65 under the control of the control unit 20 to change an output wavelength $\lambda i$ (i=1, 2, ..., N), which is the wavelength of the light passing through the reflection films 63 and 64.

The light receiver 70 is, for example, a CCD (charge coupled Device) and is an imaging device that photoelectrically converts light 32 having passed through the spectroscopic element 60 and having a second wave number to produce an electric signal representing the measurement target object.

The spectroscopic element 60 of the spectroscopic camera 100 sequentially receives instructions representing a plurality of measurement bands (multiple bands) from the control unit 20, so that the wavelength of the light that passes through the spectroscopic element 60 is sequentially changed. The spectroscopic camera 100 thus captures images of the measurement target object with sensitivities at the plurality of wavelength bands.

The control unit 20 includes a processor 21, which generates a matrix representing the spectral characteristics based on the output from the light receiver 70 and further generates a correction matrix by using the inversion matrix of the matrix, and a storage section 24 as a storage that stores the correction matrix. Specifically, the processing section 21 includes a matrix generator 22, which generates the matrices described above, and a correction matrix generator 23, which generates the correction matrix. The control unit 20 includes one or more processors, and the one or more processors, for example, operate in accordance with a control program stored in the storage section 24 to allow the control unit 20 to oversee and control the operation of the spectroscopic camera 100.

The processing section 21 carries out a variety of processes by executing the control program as a computer program. The storage section 24 includes a RAM (random access memory), a ROM (read only memory), and other memories. The RAM is used to temporarily store a variety of data and other pieces of information, and the ROM stores the control program, control data, and other pieces of information for controlling the operation of the spectroscopic camera 100. The processing section 21 carries out the processes by using the data and parameters stored in the storage section 24.

How to determine the spectral characteristics of the spectroscopic camera 100 according to the present embodiment will next be described with reference to FIGS. 4, 5, 6, 7, 8, and 9.

Figure 4:
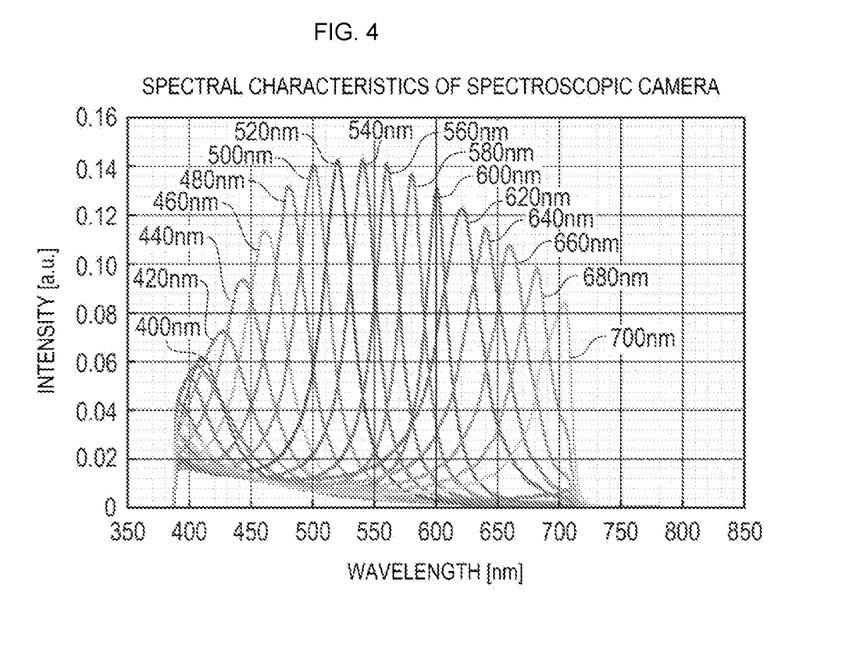
FIG. 4 shows graphs illustrating the spectral characteristics of the spectroscopic camera.

The spectral characteristics of the spectroscopic element 60 are measured with the light receiver 70 such as an area sensor by introducing light from the spectroscopic light source (constant energy spectroscopic light source PVL-3310 manufactured by Asahi Spectra Co., Ltd.) into the spectroscopic camera 100. That is, the spectral characteristics are measured as those of the spectroscopic camera 100. The spectral characteristics measured by the spectroscopic camera 100 also contain the spectral characteristics of the bandpass filter 50 and the light receiver 70, as described above. Specifically, the spectral characteristics can be determined by Expression (7) below.

$$M_{(e\lambda,\lambda)} = ET_{(e\lambda,\lambda)} \cdot B_{(\lambda)} \cdot PD_{(\lambda)} \tag{7}$$

Expression (7) can be used to determine the spectral characteristics M measured by the spectroscopic camera 100. M represents the product of the characteristics of the components described above (m×m matrix). ET represents the spectral characteristic of the spectroscopic element 60. B represents the spectral characteristics of the bandpass filter 50. PD represents the sensitivity of the light receiver 70. The second wavelength number eλ represents driving wavelengths at which the spectroscopic element 60 is driven (measurement interval). λ represents data wavelengths at which data on the characteristics are provided (data interval). That is, there are two methods for generating the spectral characteristics: a method for directly measuring the spectral characteristics as described above; and a method for calculating the spectral characteristics by multiplying the data on the characteristics.

FIG. 4 shows graphs illustrating the spectral characteristics M produced by actual measurement with the spectroscopic camera 100. Specifically, the spectral characteristics M shown in FIG. 4 are graphs produced by the product of the spectral characteristics of the spectroscopic element 60 shown in FIG. 1, the spectral characteristics of the bandpass filter 50 shown in FIG. 5, and the sensitivity characteristics of the light receiver 70 shown in FIG. 6.

Figure 5:
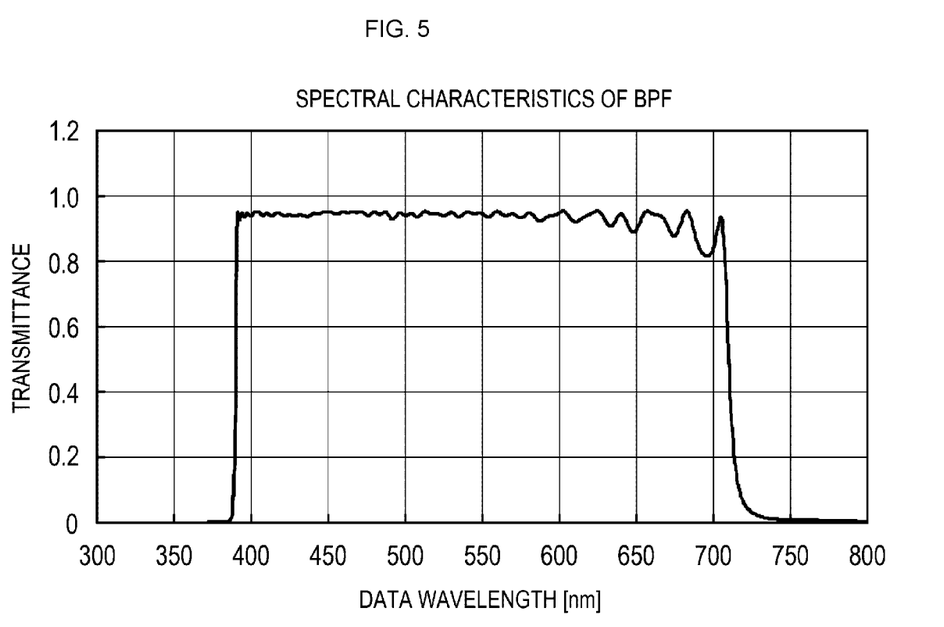
FIG. 5 shows a graph illustrating the spectral characteristics of a bandpass filter.
Figure 6:
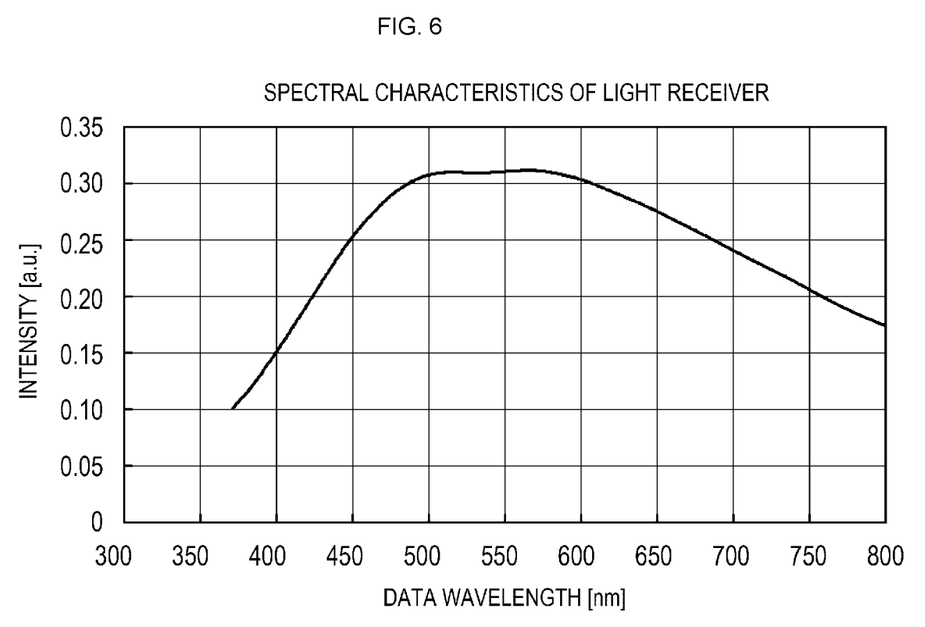
FIG. 6 shows a graph illustrating the sensitivity characteristics of a light receiver.

In FIGS. 4, 5, and 6, a control wavelength at which the spectroscopic element 60 is controlled to output light ranges from 400 nm to 700 nm and is incremented by 20 nm, and at each of the values of the control wavelength, for example, at the control wavelength of 400 nm, the spectral characteristics from 400 nm to 700 nm are provided. The wavelength at which the spectral characteristics from 400 nm to 700 nm are provided is called a data wavelength. In a matrix, the row elements represent the data wavelengths, and the column elements represent the control wavelengths at which the spectroscopic element 60 is controlled to output light.

The spectroscopic camera 100 according to the present embodiment performs the measurement by multiplying the output P from the spectroscopic camera 100 by the correction matrix in the form of the inverse matrix $M^{-1}$ of the matrix representing the actually measured spectral characteristics shown in FIG. 4, as indicated by Expression (8) below. An original true intensity spectrum Rt can thus be determined.

$$Rt_{(\lambda)} = M^{-1}{}_{(\lambda,e\lambda)} \cdot P_{(e\lambda)} \tag{8}$$

Specifically, Rt in Expression (8) represents the true output as a result of correction of the characteristics of the spectroscopic element 60, that is, the intensity spectrum. That is, Rt is the spectrum of the light that actually enters the spectroscopic camera 100. $M^{-1}$ represents the inverse matrix of the characteristics measured by the light receiver 70 and produced in accordance with Expression (7). P represents the output produced by the spectroscopic camera 100 and containing the light source characteristics and other characteristics.

Figure 7:
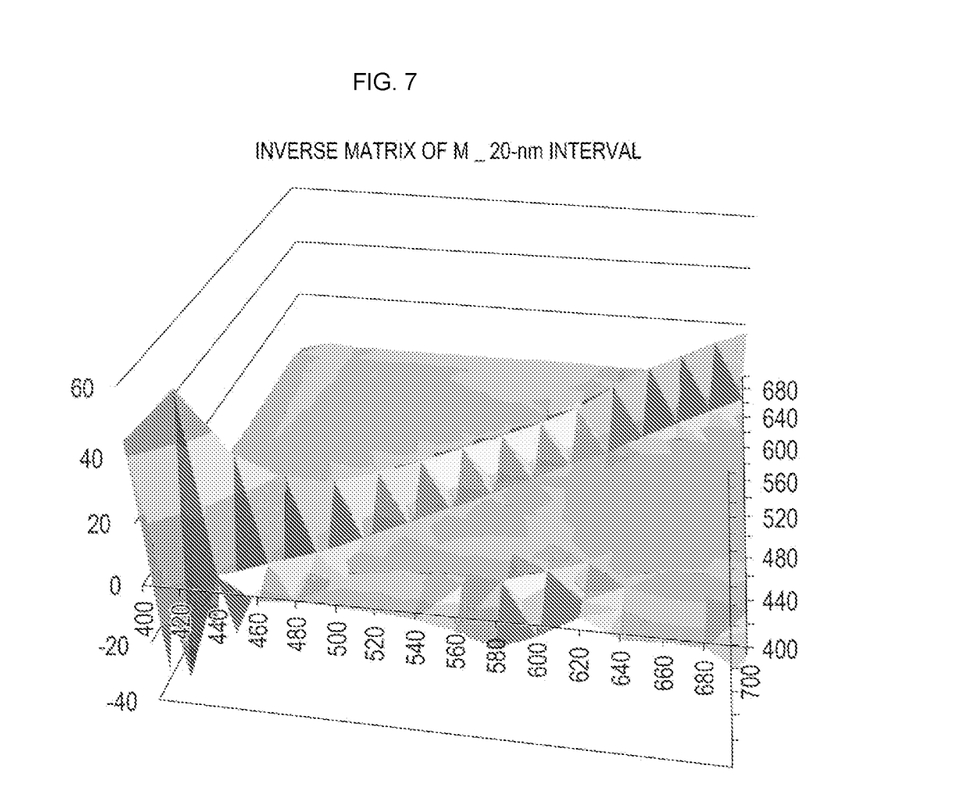
FIG. 7 shows a graph illustrating the inverse matrix of the spectral characteristics.

FIG. 7 shows a graph illustrating the inverse matrix $M^{-1}$. Specifically, the graph shows the inverse matrix $M^{-1}$ produced when the measurement interval is 20 nm (m=16), that is, the correction value for the spectroscopic camera 100. Performing the correction as described above can cancel out the characteristics of the spectroscopic element.

Expression (9) below is an expression for determining the reflection spectrum. The reflection spectrum is determined in the form of an intensity spectrum, and white is measured, for example, before red is measured. Also in this case, the correction is performed in the same manner as described above.

$$R_{(\lambda)}^{color} = \frac{Rt_{(\lambda)}^{color}}{Rt_{(\lambda)}^{White}} \cdot R_{(\lambda)}^{White-data} \tag{9}$$

For example, to determine the reflectance, the corrected intensity spectrum of red is divided by the intensity spectrum of the white, which is the reference, and the result of the division is then multiplied by original calibration data of the reference white to calculate a correct reflection spectrum of red. An accurate spectrum can thus be determined. The spectrum of the light from the light source can also be correctly measured, for example, by multiplication of a luminance calibration factor.

Figure 8:
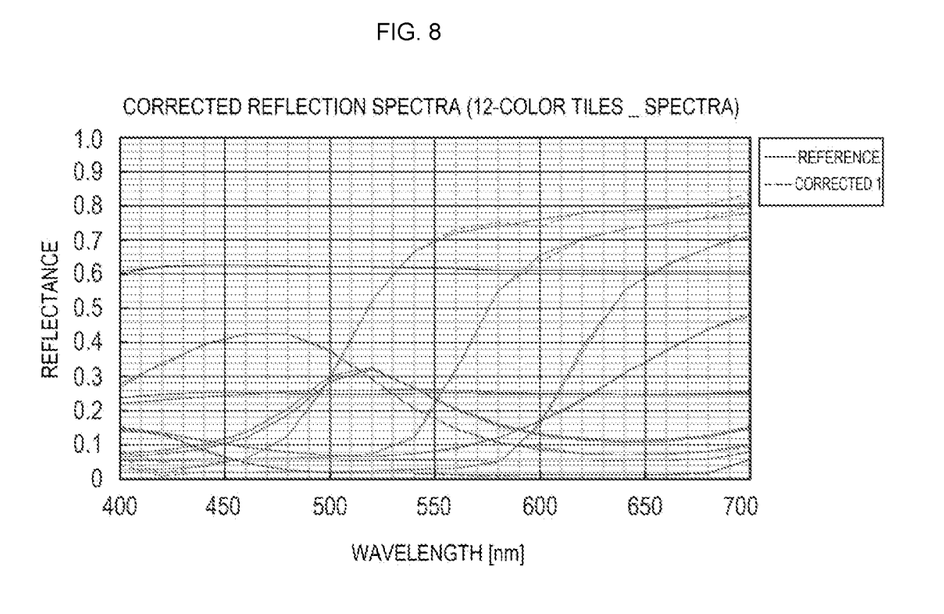
FIG. 8 shows graphs illustrating corrected reflection spectra.

FIG. 8 shows graphs illustrating the result of the calculation of the reflectance R as a result of the multiplication of the output P produced by the light receiver 70 when 12 colors of the BCRA tiles are measured with the spectroscopic camera 100 by the correction value $M^{-1}$ described above. That is, the graphs represent the corrected reflection spectra.

Specifically, the graphs show comparison between the true reflection spectra produced by the reference spectrometer and drawn with solid lines and the reflection spectra measured with the spectroscopic camera 100 drawn with broken lines, as in FIG. 2. In FIG. 8, the horizontal axis represents the wavelength (nm), and the vertical axis represents the reflectance. The reflection spectra measured with the spectroscopic element 60 and drawn with the broken lines are produced by using an LED light source, as in FIG. 2.

The true reflection spectra (solid lines), which are the reference, and the corrected reflection spectra (broken lines) can be made to substantially equal to each other by using the method for correcting the spectroscopic camera 100 according to the present embodiment, as shown in FIG. 8.

It has been shown that the correction method described above can be used to measure a reflection spectrum with substantial correctness, and the method can also be used to measure the spectrum of the light from the light source such as an LED with substantial correctness. When the light source is measured, the spectrum of the light from the light source is the true output Rt as a result of the correction of the spectral characteristics, and calibration of the true output Rt provides a correct luminance spectrum.

Figure 9:
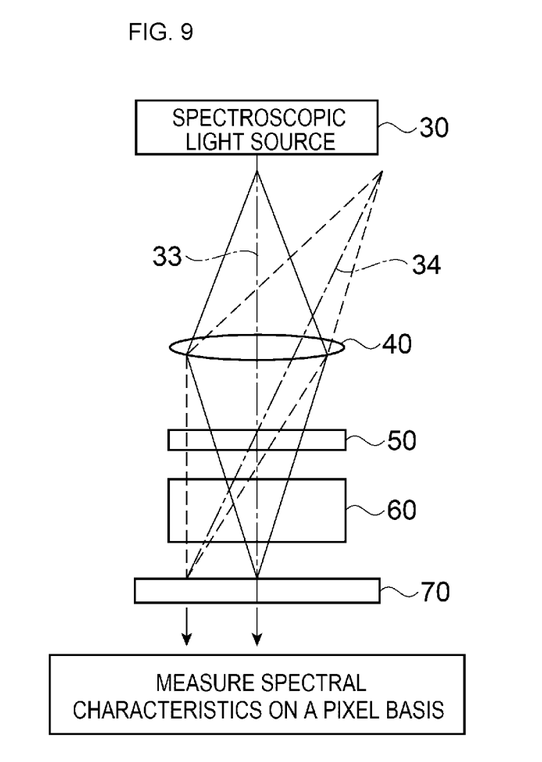
FIG. 9 describes correction in a measurement area of the spectroscopic camera.

In the spectroscopic camera 100 using an etalon as the spectroscopic element 60, the spectral characteristics vary in accordance with the difference in angle between beams 33 and 34 incident on the spectroscopic element 60, in-plane gap unevenness in the spectroscopic element 60 itself, and the location of the light receiver 70, as shown in FIG. 9. In view of the fact described above, correct measurement can be made for all pixels in the light receiver 70 by measuring the spectral characteristics on a pixel basis with the light receiver 70 such as an area sensor, creating a correction value on a pixel basis, and performing the correction on a pixel basis. Furthermore, an in-area difference in the measurement can be reduced.

Figure 10:
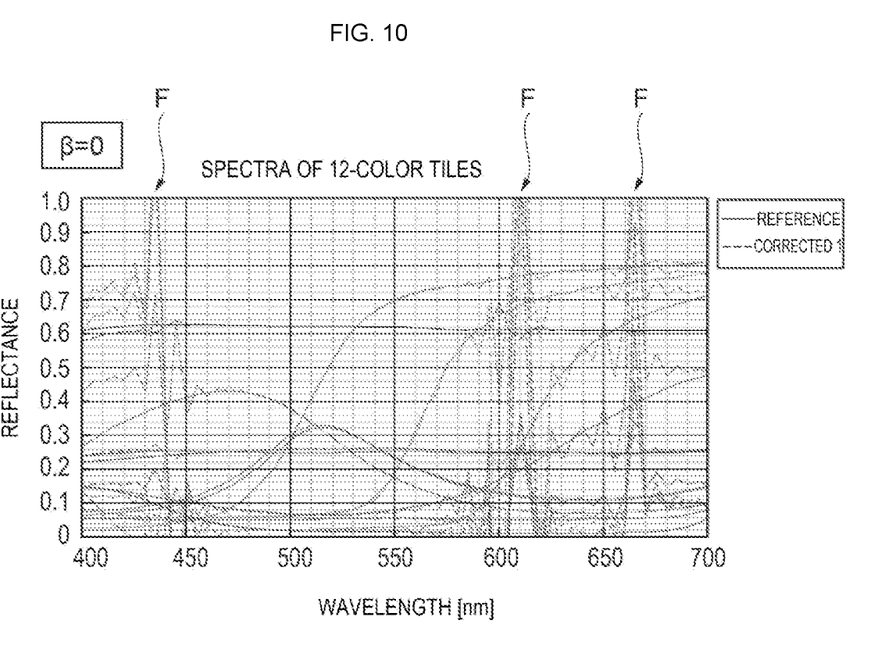
FIG. 10 shows graphs illustrating the reflection spectra before the addition of a parameter.

A correction method for suppressing overfitting by adding a parameter (regularization) to the correction value will next be described with reference to FIGS. 10 and 11.

In the spectroscopic camera 100, when the intervals in the measurement is reduced, overfitting (incorrect evaluation due, for example, to magnified noise) occurs in some cases. In this case, correct spectral characteristics can be produced by adding a parameter (regularization) to the correction value, as shown in FIGS. 10 and 11.

Expressions (10) to (13) below show the correction method using an added parameter that suppresses overfitting that occurs in the spectroscopic camera 100. FIGS. 10 and 11 show graphs illustrating the reflection spectra before and after a parameter β is added to the correction value. It is noted that the measurement intervals is 5 nm.

$$M_{(e\lambda,\lambda)} = ET_{(e\lambda,\lambda)} \cdot B_{(\lambda)} \cdot PD_{(\lambda)} \quad (10)$$

$$M' = M_{(e\lambda,\lambda)} + \beta I \quad (11)$$

$$Rt_{(\lambda)} = M'^{-1} \cdot P_{(e\lambda)} \quad (12)$$

$$R_{(\lambda)}^{color} = \frac{Rt_{(\lambda)}^{color}}{Rt_{(\lambda)}^{White}} \cdot R_{(\lambda)}^{White-data} \quad (13)$$

Expression (11) shows that the parameter β is added to the product M of the characteristics. In Expression (11), I represents a unit matrix (E). Expression (12) determines the true output Rt as a result of correction of the characteristics of the spectroscopic element 60.

Figure 11:
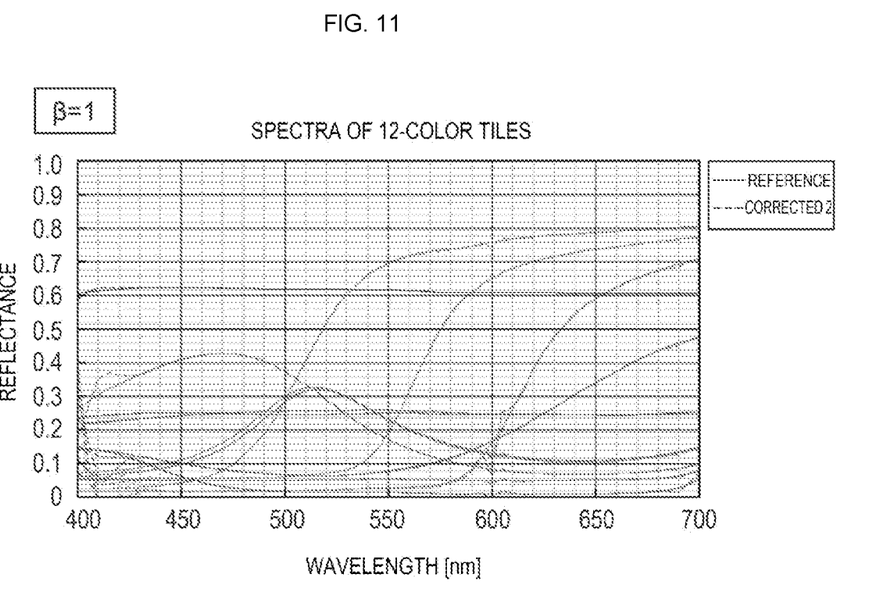
FIG. 11 shows graphs illustrating the reflection spectra after the addition of the parameter.

When the correction value $M'^{-1}$ contains the parameter β as described above, overfitting portions F shown in FIG. 10 are suppressed, and more correct reflection spectra can be produced over the entire measurement wavelength range, as shown in FIG. 11. FIG. 10 shows graphs illustrating the reflection spectra in a case where the parameter β is 0. FIG. 11 shows graphs illustrating the reflection spectra in a case where the parameter β is 1.

A basic form of the correction will next be described.

M represents the spectral characteristics measured and produced by the spectroscopic camera 100 in the form of a camera equipped with an etalon, that is, the spectroscopic element 60. The corrected output Rt from the light receiver can be determined by Expression (14). $M^\dagger$ represents a correction value different from $M^{-1}$. P represents the output from the light receiver.

$$Rt = M^\dagger P \quad (14)$$

The corrected reflectance R can be determined by using Expression (15). $R^{White-data}$ represents a reference reflectance calibration value.

$$R = \frac{Rt}{Rt^{White}} R^{White-data} \quad (15)$$

M in Expression (16) below represents the spectral characteristic of the spectroscopic camera 100 in the form of a camera. ET represents the spectral characteristic of an etalon, that is, the spectroscopic element 60. B represents the spectral characteristics of the bandpass filter (BPF) 50. PD represents the sensitivity of the light receiver 70. eλ represents the driving wavelength (measurement interval). λ represents the data wavelength (data interval). n represents the number of data on eλ and λ.

$$M(e\lambda_n, \lambda_n) = ET(e\lambda_n, \lambda_n) \times B(\lambda_n) \times PD(\lambda_n) \quad (16)$$

The spectral characteristics M are basically expressed by a square matrix having the same number of rows and columns. That is, the number of data on eλ is equal to the number of data on λ.

Figure 12:
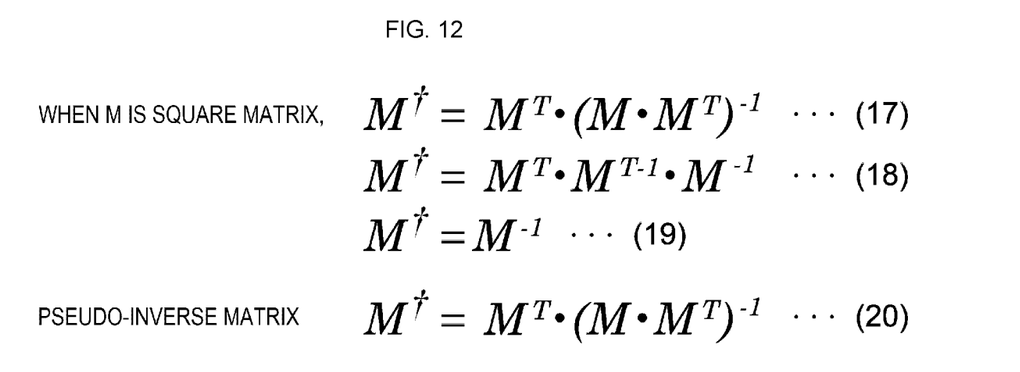
FIG. 12 shows expressions for determining another correction value.
Figure 13:
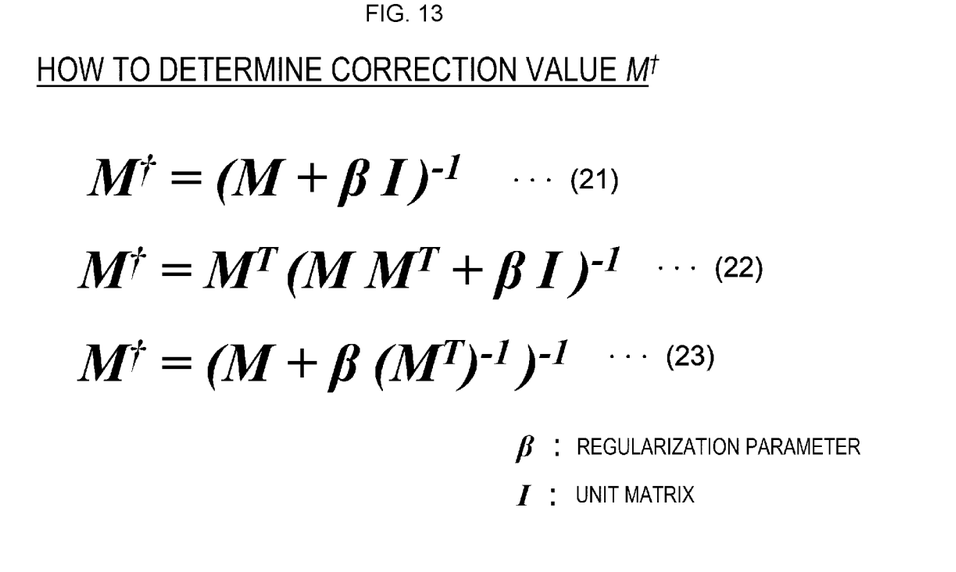
FIG. 13 shows expressions for determining the other correction value.

Expressions for determining the correction value $M^\dagger$ in the case where the spectral characteristics M are expressed by a square matrix and the case where the spectral characteristics M are expressed by a non-square matrix will next be described with reference to FIGS. 12, 13, and 14.

In the case where the spectral characteristics M are expressed by a square matrix, the correction value $M^\dagger$ = inverse matrix $M^{-1}$ of M, as indicated by Expressions (17) to (19) below. In the case where the spectral characteristics M are expressed by a non-square matrix, the correction value $M^\dagger$ can be determined as a pseudo-inverse matrix, as indicated by Expression (20).

$$M^\dagger = M^T \cdot (M \cdot M^T)^{-1} \quad (17)$$

$$M^\dagger = M^T \cdot M^{T-1} \cdot M^{-1}( \quad (18)$$

$$M^\dagger = M^{-1} \quad (19)$$

$$M^\dagger = M^T \cdot (M \cdot M^T)^{-1} \quad (20)$$

Specifically, there are three methods for determining the correction value $M^\dagger$, as indicated by Expressions (21) to (23) below. The three correction values $M^\dagger$ are each a portion containing the regularization parameter β and the unit matrix I as a portion different from Expressions (19) and (20) described above.

$$M^\dagger = (M + \beta I)^{-1} \quad (21)$$

$$M^\dagger = M^T (M M^T + \beta I)^{-1} \quad (22)$$

$$M^\dagger = (M + \beta (M^T)^{-1})^{-1} \quad (23)$$

Expression (21) is an expression for determining the correction value $M^\dagger$ in the case where the spectral characteristics M are expressed by a square matrix. Specifically, when the parameter β has a large value, the correction value $M^\dagger$ approaches the unit matrix I=1 and becomes equal to the correction value $M^\dagger$ in the case where no correction is made. On the other hand, when the parameter β is 0, the correction value $M^\dagger$ is a simple inverse matrix $M^{-1}$ of the spectral characteristics M. That is, the parameter β is a parameter that restricts the amount of correction. It can be said in a broad sense that the parameter β is a regularization parameter. Overfitting is a phenomenon caused by overcorrection and can therefore be suppressed by adjusting the parameter β.

Expression (22) is an expression for determining the correction value $M^\dagger$ in the case where the spectral characteristics M are expressed by a non-square matrix. Specifically, Expression (22) is a generally known pseudo-inverse matrix to which a regularization term BI is attached. Even when the spectral characteristics M are expressed by a non-square matrix, the inverse matrix $M^\dagger$ of M can be determined. For example, even in the case of an m×n matrix M in which the number of data on eλ is n=16 with the measurement interval being 20 nm and the number of data on λ is m=61 with the data interval being 5 nm, the inverse matrix of the matrix can be calculated, and the correction value M† can be produced. It is, however, noted that even when the measurement interval is 20 nm (n=16), the output interval after the correction is 5 nm (m=61).

Expression (23) is a simplified version of expression (22) provided that the spectral characteristics M are expressed by a square matrix in the pseudo-inverse matrix with a regularization term in Expression (22). Specifically, the term $\beta(M^T)^{-1}$ is the regularization term. The behavior of the correction value M† with respect to the parameter β differs from that in Expression (21). When the parameter β is 0, the correction value M† is the simple inverse matrix $M^{-1}$ of M, as in Expression (21).

Figure 14:
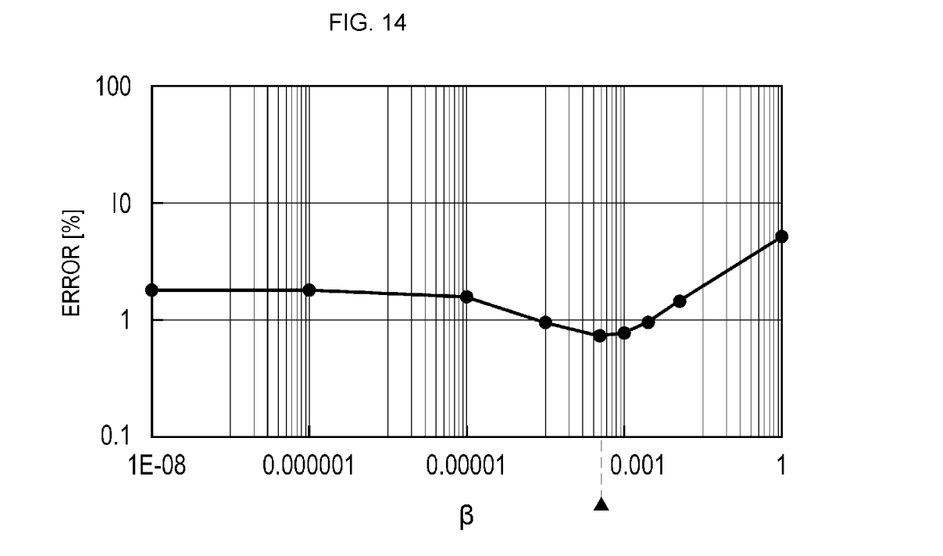
FIG. 14 describes how to determine the parameter.

FIG. 14 describes how to determine the parameter β. A sample is first measured with the spectroscopic camera 100 and corrected. The value of the parameter β is then changed, and an error from a reference value of the sample is then checked. Specifically, a parameter β that minimizes the error is selected, as indicated by the graph shown in FIG. 14. The sample may, for example, be the 12 colors of the BCRA tiles. Calibration data on the BCRA tiles or data measured with a high-precision spectroscope is used as the reference value. Expression (24) is an example of an expression for calculating the error of the reflection spectrum (see FIG. 14).

$$S_R = \left\{ \frac{1}{n} \Sigma [(R - R_{Std}) \cdot 100]^2 \right\}^{\frac{1}{2}} \quad (24)$$

Expression (25) below shows the content of an expression for the correction. For example, multiplying the output outputted at 20-nm intervals from the light receiver over the range from 400 nm to 700 nm by a correction matrix (a correction value) allows determination of a matrix from 400 nm to 700 nm. The resultant matrix represents a spectrum. A measured light source spectrum S can be determined by using Expression (26). k represents a luminance calibration coefficient.

$$Rt = M^\dagger P \quad (25)$$

$$S = k\, Rt \quad (26)$$

As described above, the spectroscopic camera 100 according to the present embodiment includes the spectroscopic element 60 and the light receiver 70, and the method for correcting the spectroscopic camera 100 includes causing the light 31 having the first wave number from the spectroscopic light source 30 to be incident on the spectroscopic element 60, causing the light receiver 70 to receive the light 32 having the second wave number and outputted from the spectroscopic element 60, generating a matrix representing the spectral characteristics of the light 32 based on the output from the light receiver 70, and storing a correction matrix generated from the inverse matrix of the matrix in the storage section 24.

According to the method described above, the actual spectral characteristics produced from the light received by the light receiver 70 are corrected, the characteristics of other components, such as a medium and a light source, can be canceled out, whereby a correct optical spectrum that is not affected by the dependence of the characteristics of the other components can be measured, as compared with the related-art method for measuring an optical spectrum based on a correction value created in advance. In addition, it is not necessary to prepare data for the correction in advance, and a correction value can be created by using only the components of the spectroscopic camera 100, whereby a highly versatile spectroscopic camera 100 can be provided. A correct optical spectrum can be measured irrespective of the measurement target object.

In the spectroscopic camera 100, it is preferable that the inverse matrix contains the correction value M†, and that the correction value M† satisfies $M^\dagger = (M + \beta \cdot I)^{-1}$, where M represents the spectral characteristics, β represents the regularization parameter, and I represents a unit matrix. Using the expression causes the unit matrix I in the correction value M† to approach 1 when the regularization parameter β has a large value, M† has the same value as that in the case of no correction. When the regularization parameter β is zero, the correction value M† is the simple inverse matrix $M^{-1}$ of the spectral characteristics M. That is, the regularization parameter β is a parameter that restricts the amount of correction. The overfitting can therefore be suppressed by adjusting the regularization parameter β.

In the spectroscopic camera 100, it is preferable that the inverse matrix contains the correction value M†, and that the correction value M† satisfies $M^\dagger = M^T (M \cdot M^T + \beta \cdot I)^{-1}$, where M represents the spectral characteristics, β represents the regularization parameter, and I represents a unit matrix. According to the method described above, the correction value M† is a generally known pseudo-inverse matrix to which a regularization term β·I is attached, and can be determined even when the spectral characteristics M are expressed by a non-square matrix.

In the spectroscopic camera 100, it is preferable that the inverse matrix contains the correction value M†, and that the correction value M† satisfies $M^\dagger = (M + \beta (M^T)^{-1})^{-1}$, where M represents the spectral characteristic, and β represents the regularization parameter. According to the method described above, when the spectral characteristics M are expressed by a square matrix, the pseudo-inverse matrix with a regularization term according to claim 3 can be determined in a simplified manner. $\beta (M^T)^{-1}$ represents the regularization term. The behavior of the correction value M† with respect to the regularization parameter β differs from that in claim 2. When the regularization parameter β is 0, the correction value M† is a simple inverse matrix $M^{-1}$ of the spectral characteristics M.

In the spectroscopic camera 100, it is preferable that the spectroscopic element 60 includes the pair of reflection films 63 and 64 and the gap changer 65 capable of changing the dimension of the gap between the pair of reflection films 63 and 64, and that the spectroscopic element 60 is disposed in the optical path of the light incident on the light receiver 70. According to the method described above, since the spectroscopic element 60 having the configuration described above is disposed in the optical path, a correct optical spectrum can be measured irrespective of the measurement target object as compared, for example, with a wavelength-dispersive spectroscopic element.

In the spectral camera 100, it is preferable that the light receiver 70 is a photosensor array. According to the method described above, since a photosensor array is used, a measurement target object can be measured over a wide range with high accuracy.

A computer program is a computer program for correcting the spectroscope camera 100 including the spectroscopic element 60 and the light receiver 70 and includes causing the light 31 having the first wave number from the spectroscopic light source 30 to be incident on the spectroscopic element 60, causing the light receiver 70 to receive the light 32 having the second wave number and outputted from the spectroscopic element 60, generating a matrix representing the spectral characteristics of the light 32 based on the output from the light receiver 70, and storing a correction matrix generated from the inverse matrix of the matrix in the storage section 24.

According to the computer program described above, the actual spectral characteristics produced from the light received by the light receiver 70 are corrected, the characteristics of other components, such as a medium and a light source, can be canceled out, whereby a correct optical spectrum that is not affected by the dependence of the characteristics of the other components can be measured, as compared with the related-art method for measuring an optical spectrum based on a correction value created in advance. In addition, it is not necessary to prepare data for the correction in advance, and a correction value can be created by using only the components of the spectroscopic camera 100, whereby a highly versatile spectroscopic camera 100 can be provided. A correct optical spectrum can be measured irrespective of the measurement target object.

A variation of the embodiment described above will be described below.

Figure 15:
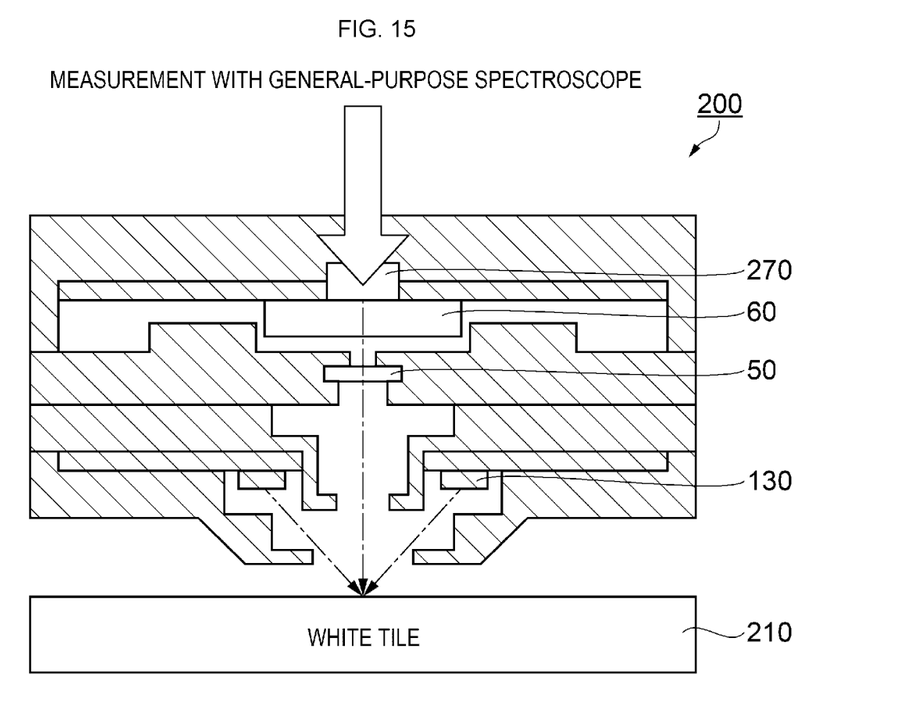
FIG. 15 shows the configuration of the spectroscopic camera according to a variation.

The spectrometer is not limited to the spectroscopic camera 100 described above and may, for example, be a spectroscopic camera 200 shown in FIG. 15.

The spectroscopic camera 200 according to the variation, in which a general-purpose spectrophotometer 270 (Otsuka Electronics Co., Ltd., MCPD) is disposed in place of the light receiver 70, differs from the spectroscopic camera 100 according to the embodiment described above in terms of the portion that measures the spectral characteristics of the spectroscopic element 60.

The spectroscopic camera 200 according to the variation includes an illumination light source (LED) 130, the bandpass filter 50, the spectroscopic element 60, and the general-purpose spectrophotometer 270. A white tile is used as a reference measurement target object 210. In the measurement described above, the spectral characteristics of the spectroscopic element 60 further contain the spectral characteristics of the illumination light source 130, the reference measurement target object 210, and the bandpass filter 50.

To calculate the correction value $M^{-1}$, the measured spectral characteristics are further multiplied by the spectral characteristics of the spectrophotometer 270 (light receiver). The spectral characteristics of the spectrophotometer 270 may be data from the manufacturer or data measured with a dedicated measurement tool that is separately provided. The method for calculating the reflectance R is the same method in the embodiment described above.

To calculate the correction value $M^{-1}$ based on the inverse matrix, the original spectral characteristic data needs to be expressed by a square matrix (m×m) having the same number of rows and columns. However, even in the case of a matrix having different numbers of rows and columns, a correction value can be created by using a pseudo-inverse matrix, as indicated by Expressions (27) to (29) below. That is, even when the spectral characteristic measurement interval eλ and the data interval A differ from each other, a correction value can be created.

$$M_{(e\lambda,\lambda)} = M'_{(e\lambda,\lambda)} \cdot PD_{(\lambda)} \quad (27)$$

$$M'_{(e\lambda,\lambda)} = ET_{(e\lambda,\lambda)} \cdot S_{(\lambda)} \cdot B_{(\lambda)} \cdot T^{White}_{(\lambda)} \quad (28)$$

$$Rt_{(\lambda)} = M^{-1}_{(e\lambda,\lambda)} \cdot P_{(e\lambda)} \quad (29)$$

The spectroscopic camera 200, which includes the built-in illumination light source 130, can measure the reflection spectrum of the white tile. When the illumination light source 130 is provided, the accuracy of the correction is improved by performing the measurement including measurement of the illumination light source 130. Furthermore, measurement using the high-precision spectrophotometer 270 allows measurement of a correct reflection spectrum.

The light receiver 70 described above may, for example, be a single photosensor, a photosensor array, an area sensor, an image sensor, or a camera.

In the embodiment described above, the light receiver 70 of the spectrometer includes an array of a plurality of two-dimensionally arranged photosensors, and may instead be formed of a single light receiving sensor.

What is claimed is:

1. A spectrometer, comprising:
a bandpass filter;
a variable wavelength spectroscopic filter, wherein the variable wavelength spectroscopic filter is different from the bandpass filter;
a photosensor; and
at least one processor configured to:
cause light having a first wavelength from a spectroscopic light source to be incident on the variable wavelength spectroscopic filter,
cause the photosensor to receive light having a second wavelength and outputted from the variable wavelength spectroscopic filter,
generate a matrix (M) representing spectral characteristics of the spectrometer based on the expression $M_{(e\lambda,\lambda)} = ET_{(e\lambda,\lambda)} \cdot B_{(\lambda)} \cdot PD_{(\lambda)}$, where
ET represents spectral characteristics of the variable wavelength spectroscopic filter,
B represents a sensitivity of the photosensor,
PD represents spectral characteristics of the bandpass filter,
eλ represents driving wavelengths of the variable wavelength spectroscopic filter, and
λ represents data wavelengths,
generate a correction matrix for correction of the spectrometer based on an inverse matrix of the matrix, and
store the correction matrix in a storage section.

2. The spectrometer according to claim 1, wherein
the inverse matrix contains a correction value $M^\dagger$, and
the correction value $M^\dagger$ satisfies $M^\dagger = (M + \beta \cdot I)^{-1}$, where M represents the spectral characteristics of the spectrometer, β represents a regularization parameter, and I represents a unit matrix.

3. The spectrometer according to claim 1, wherein
the inverse matrix contains a correction value $M^\dagger$, and
the correction value $M^\dagger$ satisfies $M^\dagger = M^T (M \cdot M^T + \beta \cdot I)^{-1}$, where M represents the spectral characteristics of the spectrometer, $M^T$ represents a transpose of the matrix M, β represents a regularization parameter, and I represents a unit matrix.

4. The spectrometer according to claim 1, wherein
the inverse matrix contains a correction value $M^\dagger$, and
the correction value $M^\dagger$ satisfies $M^\dagger = (M + \beta (M^T)^{-1})^{-1}$, where M represents the spectral characteristics of the spectrometer, $M^T$ represents a transpose of the matrix M, and β represents a regularization parameter.

5. The spectrometer according to claim 1, wherein the variable wavelength spectroscopic filter includes a pair of reflection films and a gap changer configured to change a dimension of a gap between the pair of reflection films, and is disposed in an optical path of the light incident on the photosensor.

6. The spectrometer according to claim 1, wherein the photosensor is a photosensor array.

7. A non-transitory computer-readable storage medium storing a computer program for correcting a spectrometer including a variable wavelength spectroscopic filter, a bandpass filter, and a photosensor, the computer program causing one or more processors of the spectrometer to provide functions of:
- causing light having a first wavelength from a spectroscopic light source to be incident on the variable wavelength spectroscopic filter;
- causing the photosensor to receive light having a second wavelength and outputted from the variable wavelength spectroscopic filter;
- generating a matrix (M) representing spectral characteristics of the spectrometer based on the expression $M_{(e\lambda,\lambda)}=ET_{(e\lambda,\lambda)} \cdot B_{(\lambda)} \cdot PD_{(\lambda)}$, where
  - ET represents spectral characteristics of the variable wavelength spectroscopic filter,
  - B represents a sensitivity of the photosensor,
  - PD represents spectral characteristics of the bandpass filter,
  - $e\lambda$ represents driving wavelengths of the variable wavelength spectroscopic filter, and
  - $\lambda$ represents data wavelengths;
- generating a correction matrix for correction of the spectrometer based on an inverse matrix of the matrix; and
- storing the correction matrix in a storage section.

* * * * *